Dec. 7, 1948.  H. L. FITCH  2,455,748
POSITION INDICATOR DEVICE FOR FILM STRIPS
Filed Dec. 15, 1945
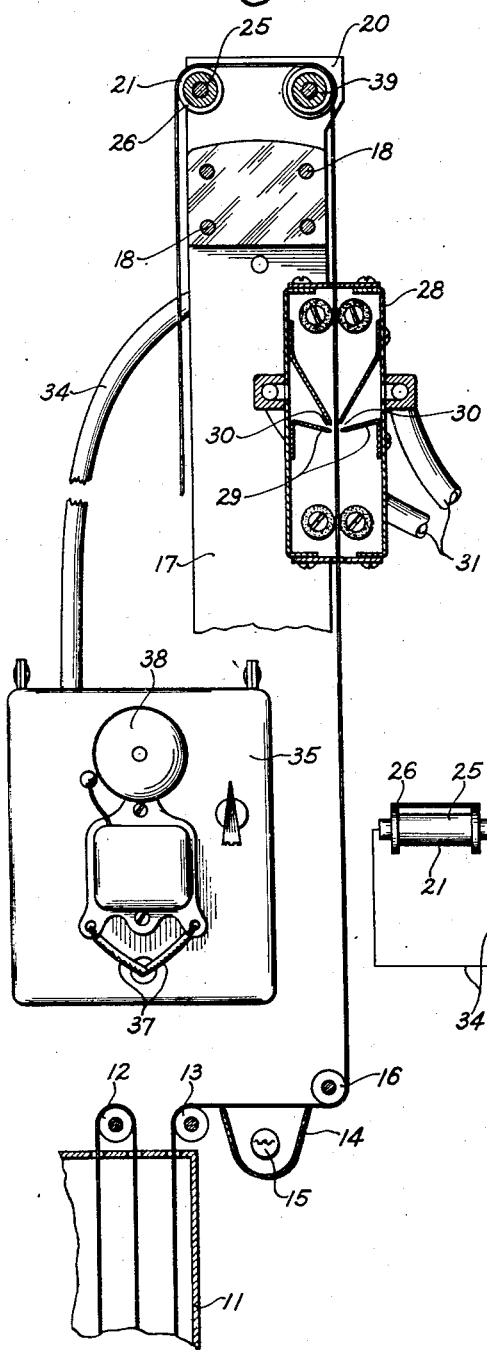
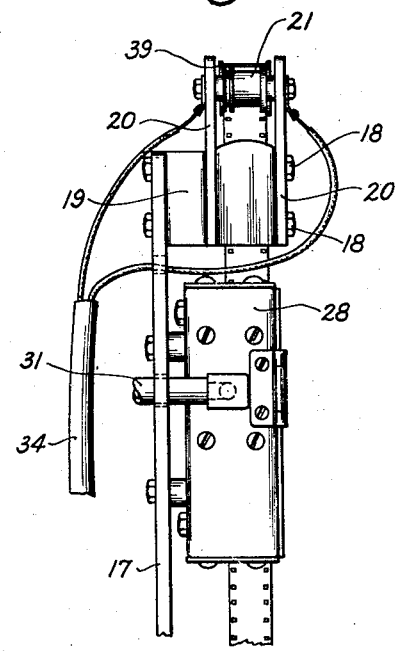
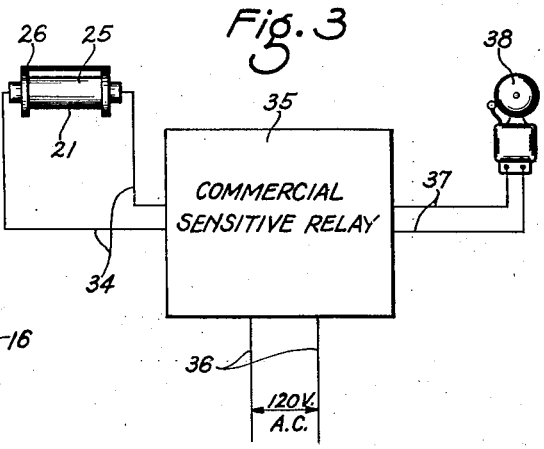
Harold L. Fitch
INVENTOR
BY
ATTORNEYS Patented Dec. 7, 1948

2,455,748

UNITED STATES PATENT OFFICE 2,455,748

POSITION INDICATOR DEVICE FOR FILM STRIP

Harold L. Fitch, Rochester, N. Y., assignor to Eastman Kodak Company, Rochester, N. Y., a corporation of New Jersey Application December 15, 1945, Serial No. 635,242

9 Claims. (Cl. 177—311)

This invention relates to photography, and more particularly to a signal device to be used on a machine or apparatus for the continuous treatment of a film strip by the reversal process.

The principal object of the invention is the provision of a signal device which will indicate the position of the film strip relative to a printing station.

Another object of the invention is the provision of a signal device which will indicate the position of the film strip relative to the processing or printing apparatus.

Still another object of the invention is the provision of a signal device which utilizes the film being treated to control the operation of the device.

Yet another object of the invention is a signal device of the class described which is relatively simple in operation, easy to use and positive in its operation.

To these and other ends, the invention resides in certain improvements and combinations of parts, all as will be hereinafter more fully described, the novel features being pointed out in the claims at the end of the specification.

In the drawings:

Fig. 1 is a front elevation of a signal device, with parts in section, constructed in accordance with the preferred embodiment of the present invention, showing the relation thereof to the treating apparatus and the printing light;

Fig. 2 is a left side elevation view of a portion of a signal device illustrated in Fig. 1, showing the relation of the control roller or switch and the air squeegee for surface drying the film strip; and Fig. 3 is a diagrammatic layout of the wiring diagram connecting the control roller or switch and the signalling device.

Similar reference numerals throughout the various views indicate the same parts.

As is well known to those in the art, a positive image can be formed on the film strip which was originally exposed in the camera. With black-and-white film, the exposed film is first processed to a negative, then exposed to the printing lamp, and further processed to a positive, the detail steps of which process are familiar to those in the art and need not be set forth here. In this second exposure, black-and-white film is re-exposed by means of a printing lamp, and it is immaterial which side of the film is exposed to the printing lamp. In the reversal processing of color film, however, the direction of application of the printing light is important, and it is imperative that such light be directed against the proper side of the film; otherwise, the film would be ruined, as is well known.

In processing color film, the silver halide grains of the film, which were exposed in the camera, are reduced to silver in the first processing operation. The various emulsion layers of the film are then successively exposed to magenta, green and blue light to develop the remaining silver grains which were originally unexposed. In these subsequent exposures, it is important to have the light directed against the proper side of the film. The first exposure is made by magenta light which is directed against the film from the base side to expose the lower or red layer which lies against the base. The green and blue lights are then successively directed against the emulsion side of the film to expose the intermediate green layer and upper blue layer. If the film strip were inadvertently turned over, the magenta light would then be directed against the emulsion side, while the green and blue light would be directed against the base side of the film. Such exposures would ruin the film, for reasons well known to those in color film processing art. It is imperative, therefore, that when processing color film, the film strip be in proper relation to the various printing lights or stations.

In order to overcome these difficulties, the present invention provides a signal device which will immediately notify the operator when and the place where the film has been turned over, thus effectively preventing the improper exposing of color film. This signal device comprises in its broadest aspects a roller of insulating material over which the film strip moves. This roller has a pair of spaced metal flanges which are spanned and connected by the film strip. These flanges, in turn, are connected into the circuit of a suitable signal device such as a bell or buzzer. These flanges constitute, in effect, a switch which is open when the base side of the film is in contact with the roller, as the base, when dry, is a non-conductor. When, however, the film is accidentally turned over to bring the emulsion side of the film against the roller, the emulsion will electrically connect and set up a feeble or weak current between these flanges. The latter are then connected through a suitable sensitive relay to the bell or other signaling device to operate the latter to indicate that the film strip has been turned over. The emulsion thus serves to electrically connect the flanges and to complete the circuit through the signaling device.

The primary purpose of the signaling device of the present invention is, therefore, the provision of a positive means for immediately notifying the operator when the film has been inadvertently turned over, whereby the possibility of improperly exposing the various color layers of the film may be eliminated. In addition, with both black-and-white and color film, it is desirable to maintain the base side of the film against the various rollers of the processing apparatus to thereby protect the emulsion against damage, as is well known. The signaling device of the present invention is also useful for this purpose and will indicate if and when the emulsion side is against the rollers so that the operator can make the necessary adjustments. For this latter purpose, a signaling device can be positioned at the inlet end of the machine of the processing apparatus to insure that the film is fed in emulsion-side up. It is important, however, with color film to place such a signaling device at each printing station to insure that the film passes such station with the emulsion side up so that the printing lights will be in proper relation to the film.

Fig. 1 shows a portion of the film processing machine which comprises a series of treating tanks 11, only a portion of one of which is shown, in which are positioned guide rollers 12 over which the film is guided through the tanks 11 and the processing solutions contained therein. At a definite point during the processing, the film strip passes over a guide roller 13 and over a printing station, broadly designated by the numeral 14, at which point the film strip is subjected to a printing light 15 of the proper color, in the case of color film. With the latter, the printing light must be positioned on the proper side of the film. In the arrangement shown, the printing station is arranged below the film for printing with a magenta light through the film base to expose the lower red layer. With the subsequent printing with green and blue light, the printing station is arranged above the film to print through the emulsion side thereof, as is well known in the art. From the printing station 14, the film strip passes under a guide roller 16 to the signal device of the present invention. The device is carried by a bracket 17, the lower end of which may be connected to the tank 11 in any suitable well-known manner.

The upper end of the bracket 17 has secured thereto, by bolts 18, a pair of insulating blocks 19 which support a pair of spaced plates 20 of insulating material in which the signal roller, broadly designated by the numeral 21, is rotatably mounted. The dried-film strip is directed to the signal roller 21 over a flanged guide roller 39, also rotatably mounted between the plates 20. Thus, the rollers are electrically insulated from the bracket 17. The signal roller 21 comprises a core 25 of insulating material, such as polysterene, on which are mounted a pair of spaced circular disks 26 which engage and support the film strip adjacent the edges thereof, as shown in Fig. 3. These disks may be made of any suitable conducting material, such, for example, as stainless steel. The film strip thus spans and connects the disks 26.

In order to insure the proper operation of the signaling device, it is necessary that surface moisture be removed from the film prior to the passing thereof over the signal roller 21. If this surface moisture is not removed, the base side of the film may act as a sufficient conductor to electrically connect the disks 26 to operate the signal, as will be later pointed out. However, even with the surface moisture removed, the surface-dried emulsion contains sufficient moisture to complete the circuit between the disks 26, when the emulsion side of the film is in contact with the roller 21. For this reason, the film strip is passed through an air squeegee before reaching the guide roller 39 and the signaling roller 21. This squeegee is mounted on the bracket 17 and comprises a rectangular housing 28 provided with a pair of nozzles 29 positioned on opposite sides of the film strip and with openings 30 positioned adjacent the film, all as shown in Fig. 1. These nozzles are connected by hose members 31 to a suitable source of air pressure or vacuum. Thus, as the film strip passes upwardly through the squeegee, the surface moisture is removed from both sides of the film strip to surface-dry the latter.

It will now be apparent that if the dry film is passed over the roller 21 with the base side of the film in contact with the disks 26, the latter will be electrically insulated by the film base and the bell of the signal device will be inoperative. However, if the film strip is accidentally turned over to bring the emulsion side against the roller, the emulsion will serve to electrically connect the disks 26. Due to the small amount of moisture in the emulsion, only a feeble current will be set up so that it is necessary to provide a sensitive relay to pick up this feeble current and to amplify it to operate the signaling device. For this reason, the disks 26 are connected by wires 34 to a sensitive relay 35 of any suitable construction, such, for example, as the electronic switches, Model ES-10, marketed by the United Cine Phone Corporation. This relay is connected by wires 36 to a suitable source of power and it is also connected by wires 37 to a signaling device 38, such as a bell or a buzzer. Thus the feeble current set up between the disks 26 through the film emulsion is amplified through the relay 35 to operate the bell 38 to notify the operator that the film strip has been turned over to bring the emulsion side against the roller 21. The operator may then make the necessary changes. From the roller 21, the film strip passes to the next portion of the processing apparatus. For convenience, the bell 38 may be mounted on the housing of the relay 35.

The present invention thus provides a suitable device which notifies the operator the position of the film strip relative to the printing station, as well as the guide rollers of the processing apparatus. If the film is properly positioned, the base of the film will be against the signal roller 21 and the bell will be rendered inoperative, but the accidental turning-over of the film will bring the emulsion side thereof against the signal roller 21 to immediately close the circuit between the disks 26 to render the signal device operative to notify the operator that the film has been turned over. This signal device thus not only protects the emulsion against damage; but, in the case of color film, insures the printing operation will be performed from the proper side of the film, the advantages of which are obvious to those in the color-film processing art.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In an apparatus for the continuous treatment of a sensitized emulsion of a strip film by a reversal process, the combination with a printing station, of a signal device, and means controlled by the emulsion of said strip for actuating said device when said strip is in a definite position relative to said station.

2. In an apparatus for the continuous treatment of a sensitized emulsion of a strip film by a reversal process, the combination with a printing station, of a signal device, actuating means for said signal device, and control means engaged by said film strip for controlling said means to operate said signal when the emulsion of said strip is in a definite position relative to said station.

3. In an apparatus for the continuous treatment of a sensitized emulsion of a strip film by a reversal process, the combination with a printing station of an electrically operated signal device, actuating means for said device, and a pair of spaced members connected in the circuit of said device and adapted to be spanned and connected electrically by said emulsion to operate said signal when said strip is in a definite position relative to said station.

4. In an apparatus for the continuous treatment of a sensitized emulsion of a strip film by a reversal process, the combination with a printing station, of an electrically operated signal device and a rotary member over which the strip moves, said member comprising a pair of spaced contacts connected into the circuit of said signal device and arranged to be connected through the emulsion of said film strip to operate said device when said strip has the emulsion thereof in engagement with said contacts.

5. In an apparatus for the continuous treatment of a strip of film by a reversal process, said film comprising a base one side of which is coated with a photographic emulsion, the combination with a printing station, of a roller positioned adjacent said station and over which said film strip moves, spaced contacts carried by said roller and engaged and spanned by said strip, a signal device, and means for electrically connecting said contacts into the circuit of said device, said contacts being electrically insulated from each other when the back of said film strip is in engagement with said roller to render the signal device inoperative, but when the emulsion side is against said roller, said emulsion serving to electrically connect said contacts to close the circuit to said device to render the latter operative.

6. In an apparatus for the continuous treatment of a strip of film by a reversal process, said film comprising a base, one side of which is coated with a photographic emulsion, the combination with a printing station, of a roller over which said film strip is arranged to move, said roller comprising a hub of insulation material and a pair of spaced electrically conducting flanges engaged and spanned by said film, a signal device, electrical actuating means connected into the circuit of said flanges and said signal device, and means positioned in advance of said roller for removing surface moisture from said base and emulsion to surface-dry said strip, said dry base being non-conductive and serving to insulate said flanges from each other when the base side of said film is against said roller to render the signal device inoperative, but the inadvertent turning of said strip to bring the emulsion side thereof against said roller serving to electrically connect said flanges through said emulsion to close the circuit through said signal device to render the latter operative to indicate that the strip has been turned over.

7. A signal apparatus for use in connection with an apparatus for the continuous treatment of a strip film to indicate the position of said strip, said device comprising, in combination, an insulated roller over which the film passes, a pair of spaced conducting flanges on said roller engaged and spanned by said strip during the passage thereover, a signal device, an electrical circuit connected to said device and flanges, said strip failing to form an electrical conductive path between said flanges when one side of said strip is in contact therewith to render the signal device inoperative, but if the opposite side of said strip is in contact with said flanges, said strip then serving to form an electrical path between said flanges to render the signal device operative to indicate that said strip has been turned over.

8. A signal apparatus for use in connection with an apparatus for the continuous treatment of a non-conducting film strip having a base, one side of which is coated with a photographic emulsion, said apparatus comprising, in combination, an insulated roller over which the film moves, a pair of spaced circular conducting flanges carried by said roller and adapted to be spanned and physically connected by said strip during the passage thereover, a signal device, and a relay connected to a source of power and connected to said device and flanges, said base failing to form an electrical conductive path between said flanges to open the circuit to said device to render the latter inoperative, but when said strip is turned over to bring the emulsion side thereof against said roller, said emulsion serving to electrically connect said flanges to close the circuit through said device to render the latter operative to indicate that said strip has been turned over on said roller.

9. A signal apparatus for use in connection with an apparatus for the continuous treatment of a non-conducting film strip having a base, one side of which is coated with a photographic emulsion, said apparatus comprising, in combination, an insulated roller over which the film moves, a pair of spaced circular conducting flanges carried by said roller and adapted to be spanned and physically connected by said strip during the passage thereover, a signal device, a relay connected to a source of power and connected to said device and flanges, and film drying means positioned ahead of said roller to dry the surface moisture from said base and said emulsion to surface dry the film, said dried base being non-conductive so that when the base side of said strip is against said roller, said flanges will be disconnected to open the circuit of said device to render the latter inoperative, but when the emulsion side of said strip is against said roller, said flanges will be electrically connected through said emulsion thereby to close the circuit of said device to render the latter operative to indicate that the emulsion side of said strip is against said roller.

HAROLD L. FITCH.

REFERENCES CITED

The following references are of record in the file of this patent:

UNITED STATES PATENTS

| Number | Name | Date |
| --- | --- | --- |
| 130,662 | Rogers | Aug. 20, 1872 |
| 1,963,096 | Petit et al. | June 19, 1934 |
| 2,109,373 | Landrock | Feb. 22, 1938 |
| 2,360,944 | Fruth | Oct. 24, 1944 |